United States Patent
Harper

(10) Patent No.: US 9,648,460 B2
(45) Date of Patent: May 9, 2017

(54) SYSTEM AND METHOD FOR LOCATION ASSURANCE OF A MOBILE DEVICE

(71) Applicant: TELECOMMUNICATION SYSTEMS, INC., Annapolis, MD (US)

(72) Inventor: Neil Harper, Mangerton (AU)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/168,818

(22) Filed: Jan. 30, 2014

(65) Prior Publication Data

US 2014/0148202 A1 May 29, 2014

Related U.S. Application Data

(62) Division of application No. 13/112,669, filed on May 20, 2011, now Pat. No. 8,718,673.

(Continued)

(51) Int. Cl.
*G01S 19/03* (2010.01)
*G01S 19/21* (2010.01)
(Continued)

(52) U.S. Cl.
CPC .............. *H04W 4/025* (2013.01); *G01S 19/03* (2013.01); *G01S 19/215* (2013.01); *G01S 19/39* (2013.01);
(Continued)

(58) Field of Classification Search
CPC ........ G01S 19/215; G01S 19/21; G01S 19/48; G01S 19/03; G01S 19/39; G01S 19/42; H04W 4/025; H04W 12/12
See application file for complete search history.

(56) References Cited

U.S. PATENT DOCUMENTS 3,150,372 A 9/1964 Groth, Jr.
3,659,085 A 4/1972 Potter et al.
(Continued)

FOREIGN PATENT DOCUMENTS

JP 06-347529 12/1994
WO WO 2006/088472 A1 8/2006

OTHER PUBLICATIONS

Argarwal, et al.: "Capacity Analysis of the GSM Short Message Service", Indian Institute of Technology Bombay, www.csa.iitb.ac.in/~varsha/allpapers/wireless/ncc03cam.pdf, 2004, pp. 1-5.
(Continued)

*Primary Examiner* — Nam Huynh
(74) *Attorney, Agent, or Firm* — Tarolli, Sundheim, Covell & Tummino LLP

(57) ABSTRACT

A method for forging location measurements at a wireless device can include determining, at the wireless device, a Cell-ID for a cell in a vicinity of a false location. The method can also include receiving, at the wireless device, an identification of a set of satellites that are within view from the false location. The method can further include generating, at the wireless device, forged location measurements that characterize satellite signals from a subset of the set of satellites that would be received at the false location. The method can still further include providing, from the wireless device, the forged location measurements.

21 Claims, 11 Drawing Sheets

Related U.S. Application Data

(60) Provisional application No. 61/347,225, filed on May 21, 2010.

(51) Int. Cl.
   *G01S 19/39* (2010.01)
   *G01S 19/42* (2010.01)
   *H04W 4/02* (2009.01)
   *H04W 12/12* (2009.01)
   *G01S 19/48* (2010.01)
   *H04W 24/10* (2009.01)
   *H04W 64/00* (2009.01)

(52) U.S. Cl.
   CPC .............. *G01S 19/42* (2013.01); *H04W 12/12* (2013.01); *G01S 19/48* (2013.01); *H04W 24/10* (2013.01); *H04W 64/00* (2013.01)

(56) References Cited

U.S. PATENT DOCUMENTS

| | | |
|---|---|---|
| 4,728,959 A | 3/1988 | Maloney et al. |
| 4,814,751 A | 3/1989 | Hawkins et al. |
| 4,845,504 A | 7/1989 | Roberts et al. |
| 4,891,650 A | 1/1990 | Sheffer |
| 5,056,106 A | 10/1991 | Wang et al. |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,404,376 A | 4/1995 | Dent |
| 5,423,067 A | 6/1995 | Manabe |
| 5,465,289 A | 11/1995 | Kennedy, Jr. |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy, Jr. |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost et al. |
| 6,014,102 A | 1/2000 | Mitzlaff et al. |
| 6,047,192 A | 4/2000 | Maloney et al. |
| 6,091,362 A | 7/2000 | Stilp et al. |
| 6,097,336 A | 8/2000 | Stilp |
| 6,097,709 A | 8/2000 | Kuwabara |
| 6,097,959 A | 8/2000 | Yost et al. |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,269,246 B1 | 7/2001 | Rao et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack et al. |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,407,703 B1 | 6/2002 | Minter et al. |
| 6,449,486 B1 | 9/2002 | Rao |
| 6,463,290 B1 | 10/2002 | Stilp et al. |
| 6,470,195 B1 | 10/2002 | Meyer |
| 6,477,161 B1 | 11/2002 | Hudson et al. |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney et al. |
| 6,553,322 B1 | 4/2003 | Ignagni |
| 6,563,460 B2 | 5/2003 | Stilp et al. |
| 6,571,082 B1 | 5/2003 | Rahman et al. |
| 6,591,112 B1 | 7/2003 | Siccardo et al. |
| 6,603,428 B2 | 8/2003 | Stilp |
| 6,603,761 B1 | 8/2003 | Wang et al. |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy et al. |
| 6,782,264 B2 | 8/2004 | Anderson |
| 6,782,265 B2 | 8/2004 | Perez-Breva et al. |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,944,465 B2 | 9/2005 | Spain et al. |
| 6,952,158 B2 | 10/2005 | Kennedy, Jr. |
| 6,987,979 B2 | 1/2006 | Carlsson |
| 6,996,392 B2 | 2/2006 | Anderson et al. |
| 7,023,383 B2 | 4/2006 | Stilp et al. |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,340,259 B2 | 3/2008 | Maloney et al. |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,460,505 B2 | 12/2008 | Spain |
| 7,593,738 B2 | 9/2009 | Anderson |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,068,802 B2 | 11/2011 | Bhattacharya et al. |

(56) References Cited

U.S. PATENT DOCUMENTS

| | | | |
|---|---|---|---|
| 8,068,855 | B2 | 11/2011 | Dressler et al. |
| 8,106,817 | B2 | 1/2012 | Bhattacharya et al. |
| 8,106,818 | B2 | 1/2012 | Bhattacharya et al. |
| 8,155,394 | B2 | 4/2012 | Allegra et al. |
| 2002/0172223 | A1 | 11/2002 | Stilp |
| 2003/0023738 | A1 | 1/2003 | Boivie et al. |
| 2003/0064734 | A1 | 4/2003 | Stilp et al. |
| 2003/0139188 | A1 | 7/2003 | Chen et al. |
| 2003/0190919 | A1 | 10/2003 | Niemenmaa |
| 2004/0043775 | A1 | 3/2004 | Kennedy et al. |
| 2004/0132466 | A1 | 7/2004 | Kennedy, Jr. |
| 2004/0203539 | A1 | 10/2004 | Benes et al. |
| 2004/0203921 | A1 | 10/2004 | Brumhead et al. |
| 2004/0218664 | A1 | 11/2004 | Kennedy, Jr. et al. |
| 2004/0252752 | A1 | 12/2004 | Kennedy, Jr. et al. |
| 2005/0058182 | A1 | 3/2005 | Kennedy, Jr. et al. |
| 2005/0136945 | A1 | 6/2005 | Kennedy et al. |
| 2005/0164712 | A1 | 7/2005 | Kennedy, Jr. et al. |
| 2005/0192026 | A1 | 9/2005 | Carlson et al. |
| 2006/0003695 | A1 | 1/2006 | Kennedy, Jr. et al. |
| 2006/0003775 | A1 | 1/2006 | Bull et al. |
| 2006/0030333 | A1 | 2/2006 | Ward et al. |
| 2006/0116130 | A1 | 6/2006 | Kennedy, Jr. et al. |
| 2006/0125695 | A1 | 6/2006 | Kennedy, Jr. et al. |
| 2006/0141998 | A1 | 6/2006 | Kennedy, Jr. et al. |
| 2006/0154607 | A1 | 7/2006 | Kennedy, Jr. et al. |
| 2006/0240836 | A1 | 10/2006 | Kennedy, Jr. et al. |
| 2007/0087689 | A1 | 4/2007 | Alles et al. |
| 2007/0111746 | A1 | 5/2007 | Anderson |
| 2007/0155401 | A1 | 7/2007 | Ward et al. |
| 2007/0155489 | A1 | 7/2007 | Beckley et al. |
| 2007/0202885 | A1 | 8/2007 | Kennedy, Jr. et al. |
| 2008/0132244 | A1 | 6/2008 | Anderson |
| 2008/0132247 | A1 | 6/2008 | Anderson |
| 2008/0137524 | A1 | 6/2008 | Anderson et al. |
| 2008/0158059 | A1 | 7/2008 | Bull et al. |
| 2008/0160952 | A1 | 7/2008 | Bull et al. |
| 2008/0160953 | A1 | 7/2008 | Mia et al. |
| 2008/0161015 | A1 | 7/2008 | Maloney et al. |
| 2008/0248811 | A1 | 10/2008 | Maloney et al. |
| 2008/0261611 | A1 | 10/2008 | Mia et al. |
| 2008/0261612 | A1 | 10/2008 | Mia et al. |
| 2008/0261613 | A1 | 10/2008 | Anderson et al. |
| 2008/0261614 | A1 | 10/2008 | Mia et al. |
| 2009/0005061 | A1 | 1/2009 | Ward et al. |
| 2009/0143076 | A1* | 6/2009 | Wachter et al. ........... 455/456.1 |
| 2010/0205316 | A1* | 8/2010 | Xue et al. ...................... 709/229 |

OTHER PUBLICATIONS

Bard, et al.: "*Time Difference of Arrival Dilution of Precision and Applications*", IEEE Transactions on Signal Processing, vol. 47, No. 2, pp. 521-523, Feb. 1999.

Bell: "*A Beginners Guide to Uncertainty of Measurement*", The National Physics Laboratory of the United Kingdom of Great Britain and Northern Ireland, Teddington, Middlesex, UK, 2001, pp. 1-41.

Caffery, Jr.: "*A New Approach to the Geometry of TOA Location*", IEEE, VTC 2000, pp. 1943-1949.

Caffery, et al.: "*Subscriber Location in CDMA Cellular Networks*", IEEE Transactions on Vehicular Technology, vol. 47, No. 2, May 1998, pp. 406-416.

Caffery, et al. 2: "*Overview of Radiolocation in CDMA Cellular Systems*", IEEE Communications Magazine, Apr. 1998, pp. 38-45.

Chan, et al.: "*A Simple and Efficient Estimator for Hyperbolic Location*", IEEE Transactions Signal Processing, vol. 42, No. 8, Aug. 1994, pp. 1905-1915.

Chen: "*A Non-Line-of-Sight Error Mitigation Algorithm in Location Estimation*", Process IEEE Conference on Wireless Communications Networking, vol. 1, 1999, pp. 316-320.

Chen, et al.: "*Joint Angle and Delay Estimation for DS-CDMA with Application to Reduced Dimension Space-Time Rake Receivers*", Mar. 1999, pp. 2933-2936.

Colman: "*A Comparison of the Accuracy of TDOA and TOA Location Algorithms with Equivalent Receiver Geometry*", Defence R&D Canada Technical Memorandum (DREO TM 2001-063), Oct. 2001, pp. 1-53.

Cong, et al.: "*Non-Line-of-Sight Error Mitigation in TDOA Mobile Location*", Process IEEE Global Telecommunications Conference, vol. 1, Sep. 2001, pp. 680-684.

Drane, et al.: "*Positioning GSM Telephones*", IEEE Communications Magazine, Apr. 1998, pp. 46-54, 59.

Foy: "*Position-Location Solutions by Taylor-Series Estimation*", IEEE Transactions Aerospace and Electronic Systems, vol. AES-12, No. 2, Mar. 1976, pp. 187-194.

Haardt, et al.: "*Joint Estimation of 2-D Arrival Angles, Propagation Delays, and Doppler Frequencies in Wireless Communications*", Proc. IEEE Digital Signal Processing Workshop, vol. 1, pp. 1-4, Bryce Canyon National Park, Utah, Aug. 1998.

Ho, et al.: "*An Accurate Algebraic Solution for Moving Source location Using TDOA and FDOA Measurements*", IEEE Transactions on Signal Processing, vol. 52, No. 9, Sep. 2004, pp. 2453-2463.

Knapp, et al.: "*The Generalized Correlation Method for Estimation of Time Delay*", IEEE Transactions on Acoustics, Speech, and Signal Processing, vol. ASSP-24, No. 4, Aug. 1976, pp. 320-327.

Leshem, et al.: "*Array Calibration in the Presence of Multipath*", IEEE Transactions on Signal Processing, vol. 48, No. 1, pp. 53-59, Jan. 2000.

Mailaender: "*On the Geolocation Bounds for Round-Trip Time-of-Arrival and All Non-Line-of-Sight Channels*", EURASIP Journal on Advances in Signal Processing, vol. 2008, pp. 1-10.

Papadias, et al.: "*Space-Time Signal Processing for Wireless Communications: A Survey*", Information Systems Laboratory, Stanford University, Apr. 16-18, 1997, 4 pages.

Paulraj, et al.: "*Space-Time Processing for Wireless Communications*", IEEE Signal Processing Magazine, vol. 11, Nov. 1997, pp. 49-83.

Rahnema: "*Overview of the GSM System and Protocol Architecture*", IEEE Communications Magazine, Apr. 1993, pp. 92-100.

Rappaport, et al.: "*Position Location Using Wireless Communications on Highways of the Future*", IEEE Communications Magazine, Oct. 1996, pp. 33-41.

Roberts: "*Project: IEEE P802.15 Working Group for Wireless Personal Area Networks(WPANS)*", Harris Corporation, Melbourne, FL, Oct. 4, 2004, pp. 1-11.

Schmidt: "*Multiple Emitter Location and Signal Parameter Estimation*", IEEE Transactions on Antennas and Propagation, vol. AP-34, No. 3, Mar. 1986, pp. 276-280.

Silventoinen, et al.: "*Mobile Station Emergency Locating in GSM*", Process IEEE International Conference, Personal Wireless Communications, vol. 1, 1996, pp. 232-238.

Stansfield: "*Statistical Theory of DF Fixing*", Journal IEE 94, Part III A, Oct. 1947, pp. 762-770.

Stein: "*Algorithms for Ambiguity Function Processing*", IEEE Transactions on Acoustics, Speech, and Signal Processing, vol. ASSP-29, No. 3, Jun. 1981, pp. 588-599.

Thomas, et al.: "*Performance of a TDOA-AOA Hybrid Mobile Location System*", 3G Mobile Communication Technologies, Conference Publication No. 477, Mar. 2001, pp. 216-220.

Torrieri: "*Statistical Theory of Passive Location Systems*", IEEE Transactions Aerospace and Electronic Systems, vol. AES-20, No. 2, Mar. 1984, pp. 183-198.

Vanderveen, et al.: "*Joint Angle and Delay Estimation (JADE) for Multipath Signals Arriving at an Antenna Array*", IEEE Communications Letters, vol. 1, No. 1, Jan. 1997, pp, 12-14.

Wang, et al.: "*A TOA-Based Location Algorithm Reducing the Errors Due to Non-Line-of-Sight (NLOS) Propagation*", IEEE Trans. Vehicular Technology, vol. 52, No. 1, Jan. 2003, pp. 112-116.

Wax: "*Position Location from Sensors with Position Uncertainty*", IEEE Transactions Aerospace and Electronic Systems, vol. AES-19, No. 5, Sep. 1983, pp. 658-662.

Wax, et al.: "*On Unique Localization of Multiple Sources by Passive Sensor Arrays*", IEEE Transactions on Acoustics, Speech, and Signal Processing, vol. 37, No. 7, Jul. 1989, pp. 996-1000.

(56) References Cited

OTHER PUBLICATIONS

Wylie, et al.: "*The Non-Line of Sight Problem in Mobile Location Estimation*", Process IEEE 5$^{th}$ International Conference on Universal Personal Communications, vol. 2, Oct. 1996, pp. 827-831.
Yang: "*Projection Approximation Subspace Tracking*", IEEE Transactions on Signal Processing, vol. 43, No. 1, Jan. 1995, pp. 95-107.
Zhao: "*Standardization of Mobile Phone Positioning for 3G Systems*", IEEE Communications Magazine, Jul. 2002, pp. 108-116.
Ziskind, et al.: "*Maximum Likelihood Localization of Multiple Sources by Alternating Projection*", IEEE Transaction on Acoustics, Speech, and Signal Processing, vol. 36, No. 10, pp. 1553-1560, Oct. 1988.

\* cited by examiner

SYSTEM AND METHOD FOR LOCATION ASSURANCE OF A MOBILE DEVICE

RELATED APPLICATIONS

The instant application is a divisional of U.S. Ser. No. 13/112,669, filed 20 May 2011; which claims priority of U.S. Provisional Application No. 61/347,225, filed 21 May 2010, entitled: "Handset-Assisted A-GPS Spoofer," the entirety of which are incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as, but not limited to, the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The LC2C signal is a second civilian frequency transmitted by GPS satellites. L1 transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Assisted-GPS ("A-GPS") has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. As one skilled in the art would recognize, the GPS reference receiver and its server (or position determining entity) may be located at any surveyed location with an open view of the sky. Typical A-GPS information may include, but is not limited to, data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device may attempt to search for and acquire satellite signals for the satellites included in the assistance data. If, however, satellites are included in the assistance data that are not measurable by the mobile device (e.g., the satellite is no longer visible, etc.), then the mobile device may waste time and considerable power attempting to acquire measurements for the satellite.

Civilian GPS signals are vulnerable to attacks such as blocking, jamming and spoofing. The goal of such attacks generally is to prevent a position lock (e.g., blocking and jamming) or to feed a receiver false information so that the receiver computes an erroneous time or location (e.g., spoofing). GPS receivers are generally aware when blocking or jamming is occurring because the receivers encounter a loss of signal. Spoofing, however, is a surreptitious attack.

Civilian GPS signals are widely used by government and private industries for important applications, including, but not limited to, public safety services, navigation, geolocation, hiking, surveying, robotics, tracking, etc. Unfortunately, civilian GPS signals are not secure. Since GPS signal strength, measured at the Earth's surface at about −160 dBw (1.times.10.sup.-16 watts), is roughly equivalent to viewing a 25 watt light bulb from a distance of 10,000 miles, GPS signals may be blocked by destroying or shielding a receiver's antenna and may be jammed by a signal of a similar frequency but greater strength. As stated above, however, blocking and jamming are not the greatest security risk. A more pernicious attack involves feeding the receiver fake or forged satellite signals so that the receiver believes it is located somewhere in space and time that it is not. Spoofing may be accomplished by utilizing a GPS satellite simulator. Such simulators are uncontrolled and widely available. To conduct the spoofing attack, an adversary may broadcast a forged satellite signal with a higher signal strength than the true signal, and the GPS receiver believes that the forged signal is actually a true GPS signal. The receiver may then proceed to calculate erroneous position or time information based on this forged signal.

It is also possible for an unscrupulous user or intermediary to alter the software in a wireless device to manipulate satellite measurements thereby causing a location determining system to calculate an incorrect location. This method of spoofing is generally termed as location spoofing. Generally, if satellite measurements are manipulated in a wireless device randomly, it is likely that a resulting position calculation may fail because the position of the respective satellites may be too far away from the actual code phase indicated location; however, a skillful user may calculate required code phases resulting in the calculation of a spoofed or false location by the location determining system.

Generally, spoofing detection has focused on detecting false radio frequency signals arriving at the GPS receiver front-end and/or authenticating location results provided to a third party. There is, however, a need in the art regarding the detection of falsified or spoofed measurements being provided to the respective position calculation function ("PCF") which may or may not be embedded in an exemplary location server ("LS"). An LS may generally be a node in a wireless network providing GPS assistance data to an A-GPS capable device. The device may utilize the assistance data to lock onto satellites much faster than if no assistance data were available and may also allow the device to lock onto weaker signals reducing TTFF and increasing yield. In a handset-assisted mode, the LS may also determine the location of the device using measurements from the device and/or the respective network. The LS may also require the device to provide true and accurate measurements (rather than falsified measurements) to determined an accurate location for the device. The integrity of the resulting location is important as it may be used by emergency services operators, used to provide value-added services, etc.

Although embodiments of the present subject matter may not prevent spoofing attacks, these embodiments may alert a wireless device user and/or an operator of a location determining system to such suspicious activity thereby decreasing the probability that a spoofing attack succeeds. Further embodiments of the present subject matter may be implemented easily and inexpensively by retrofitting existing GPS receivers and exemplary location determining systems.

Accordingly, there is a need for a method and system for determining falsified satellite measurements and/or falsified locations of a mobile device that would overcome the deficiencies of the prior art. Therefore, an embodiment of the present subject matter provides a method for determining whether an estimated location of a wireless device includes one or more forged location measurements. The method may include determining a first estimated location of the wireless device using a first set of location measurements and determining a second estimated location of the wireless device using a second set of location measurements. The first estimated location may then be compared to the second estimated location. If the comparison between the first estimated location and second estimated location is greater than a predetermined threshold, then one of the determined locations may be identified as having one or more forged location measurements.

Another embodiment of the present subject matter provides a method for determining whether an estimated location of a wireless device includes a forged location measurement. The method may include determining a first estimated location of the wireless device from information or signals provided by a cellular network and determining a second estimated location of the wireless device from signals received from a set of satellites. The first and second estimated locations may then be compared. If the comparison between the first estimated location and second estimated location is greater than a predetermined threshold, then the second estimated location may be identified as having one or more forged signals.

A further embodiment of the present subject matter may provide a system for determining whether an estimated location of a wireless device includes one or more forged location measurements. The system may include circuitry for determining a first estimated location of the wireless device from a first set of location measurements and circuitry for determining a second estimated location of the wireless device from a second set of location measurements. The system may also include circuitry for comparing the first estimated location to the second estimated location and circuitry for identifying one of the determined locations as having one or more forged location measurements if the comparison between the first estimated location and second estimated location is greater than a predetermined threshold.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
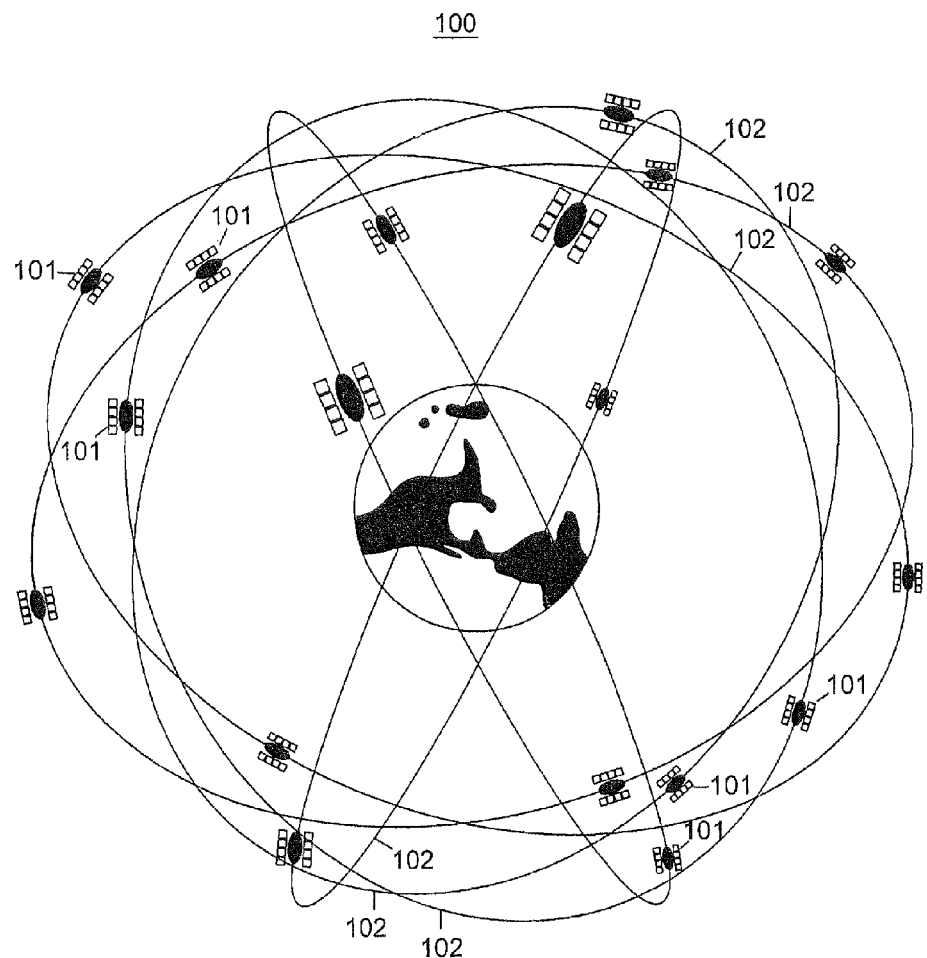
FIG. 1 is a schematic representation of a constellation of GPS satellites.

With reference to the figures where like elements have been given like numerical designations to facilitate an understanding of the present subject matter, the various embodiments of a system and method for location assurance of a mobile device are herein described.

The present disclosure relates to a mobile appliance, handset or device and a location determining system using satellite signals and/or measurements of these satellite signals as well as location measurements from other networks and location technologies. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to GPS, such as, but not limited to, the European Satellite project, Galileo; the Russian satellite navigation system, GLONASS; the Japanese Quasi-Zenith Satellite System ("QZSS"), the Indian Regional Navigational Satellite System ("IRNSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above. Further, the terms spoofed, falsified, forged, and various tenses and forms thereof are utilized interchangeably throughout this disclosure and such use should in no way should be interpreted as limiting the scope of the claims appended herewith.

As discussed above, A-GPS devices or handsets may have a low TTFF as the devices are supplied with assistance data from an exemplary communications network to assist in locking onto or acquiring satellites quickly. Exemplary A-GPS devices may include, but are not limited to, a cellular device, text messaging device, computer, portable computer, vehicle locating device, vehicle security device, communication device, and wireless transceiver. These devices may provide satellite measurements back to a location determining system to perform a position calculation. Exemplary network elements that supply the assistance data and/or perform the position calculation may be a location determining system such as a Mobile Location Center ("MLC"), location information server or system ("LIS" or "LS"), or other comparable network element. The location determining system may generally be a node in a wireless network performing or determining the location of a mobile device. The location determining system generally requires a wireless device to provide true and accurate measurements (rather than forged measurements) to determine an accurate location of a device or provide accurate assistance data for the device. The integrity of the resulting location is important as the location may be used by emergency services operators to find an injured person, may be used for location-based services, etc.

Figure 2:
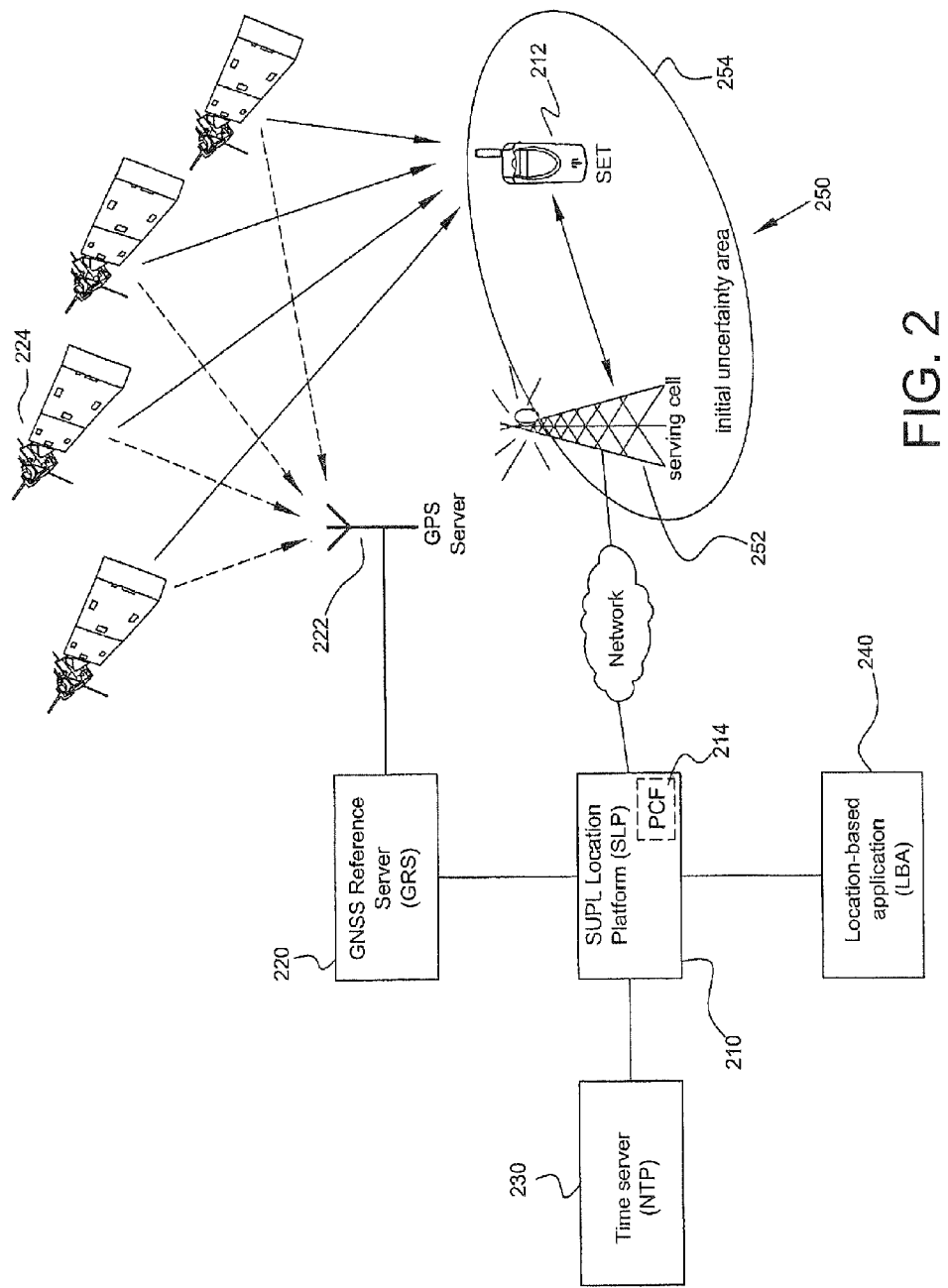
FIG. 2 is a representation of an exemplary A-GPS server in a wireless network.

In one embodiment of the present subject matter, an exemplary method may be utilized to determine whether a geographic location of a mobile or wireless device (or signals used therefor) has been spoofed or forged. One exemplary A-GPS server in a wireless network according to an embodiment of the present subject matter is shown in FIG. 2. With reference to FIG. 2, an exemplary LS may be, but is not limited to, a Secure User Plane Location (SUPL) Location Platform (SLP) 210. Of course, in a GSM network the LS may be a Serving Mobile Location Center (SMLC), a Standalone SMLC (SAS) in a UMTS network, or another type of network and/or node therein. The SLP 210 may generally be a network entity facilitating the location determination of devices in the network. A User Plane Location Protocol (ULP) (an HTTP-based protocol) may be, in one embodiment, employed between the SLP 210 and the wireless device or a SUPL-Enabled Terminal (SET) 212.

An exemplary SLP 210 may be provided with a connection to a GNSS Reference Server (GRS) 220 to retrieve and/or cache assistance data. The GRS 220 may include a network of reference receivers 222, e.g., GNSS receivers, and a central system adaptable to collate assistance data from any number of satellites 224 so assistance data may be available upon request. The SLP 210 may also be provided with a connection to a time server using Network Time Protocol (NTP) 230 to maintain the correct time thereon. Location requests may be initiated either from the SET 212 (i.e., a SET-initiated transaction) or from the network (i.e., a Network-initiated transaction). In one embodiment, a Network-initiated request may be provided by a Location Based Application (LBA) 240 to the SLP 210 for the location of a target SET 212. In a non-limiting embodiment, the LBA 240 may provide value added services such as a find-a-friend application, an emergency services application, or another location based services application. The SLP 210 may thus perform applicable messaging functions with the SET 212 and may determine a location of the SET 212 before returning that location to the LBA 240.

In one embodiment, when an A-GPS location fix is required for a SET 212, the SLP 210 may determine GPS assistance data specific to an approximate location of the SET 212. For example, when the SET 212 is in a cellular network 250, an approximate location may be provided by the coverage area of the serving cell 252. Of course, the approximate location of the SET 212 may be provided by any number of means and such an example should not limit the claims appended herewith. The SET 212 may then provide an identification of the serving cell 252 (e.g., Cell-ID) to the SLP 210, and the SLP 210 may determine which satellites 224 are in view from the approximate location and provide applicable assistance data for those satellites 224 to the SET 212. Exemplary assistance data may, in one embodiment, depend upon the mode of A-GPS. For example, in a handset-based A-GPS embodiment, the SLP 210 may provide the navigation model, ionosphere model, reference time, and reference location whereby the SET 212 utilizes this information to lock onto satellites 224 and determine its respective location. By way of a further example, in a handset-assisted mode, the SLP 210 may provide acquisition assistance and reference time to allow the SET 212 to lock onto satellites 224 and return the applicable measurements to the SLP 210. The SLP 210 may then, in one embodiment, invoke a PCF 214 to determine the SET's location.

In an exemplary handset-assisted, Network-initiated A-GPS location fix process, the LBA 240 may, in one embodiment, transmit a request to the SLP 210 for the location of a target SET 212. The SLP 210 may then transmit a message to the SET 212 to commence the location determination transaction whereby the SET 212 provides a message in response to the SLP 210 including, for example, the Cell-ID of the serving base station 252. The SLP 210 may then determine the coverage area of the cell and employ this as an initial uncertainty area 254. The SLP 210 may then determine appropriate GPS assistance data utilizing the uncertainty area 254 and may provide the same to the SET 212. The SET 212 would then utilize the assistance data to lock onto a number of satellites 224 and return satellite measurements to the SLP 210. The SLP 210 may then determine the location of the SET 212 utilizing the satellite measurements provided by the SET 212 and provide the determined location of the SET 212 to the LBA 240.

Table 1 below provides fields that may be sent from the SET 212 to the SLP 210 and utilized by the SLP 210 to determine the location of the SET 212. The location of the SET 212 may be determined by the SLP 210 using, for example, code phase measurements (whole chips and fractional chips), Doppler measurements, and/or additional measurements provided by the network, such as, but not limited to, Carrier to Noise ratio (C/N.sub.O), a Multipath indicator, a Pseudorange RMS error, or other measurements that provide information regarding the quality of satellite measurements. Additional data provided by the SET 212 as discussed above may be, but is not limited to, the identification of the serving cell (Cell-ID). The SLP 210 may utilize the Cell-ID to determine appropriate cell information from a database. This cell information may include the location of the cell which can then be employed by the SLP 210 as an initial location to calculate assistance data or may also be utilized as a seed location for an exemplary position calculation.

TABLE 1

| Parameter | Range | Units | Notes |
| --- | --- | --- | --- |
| GPS TOW | 0-63 | | The GPS time of week |
| Satellite ID | | | The identifier of the satellite. TO convert to PRN, add 1. |
| C/N$_o$ | 0-63 | Db-Hz | SET's estimate of the carrier to noise ratio. |
| Doppler | +/1 6553.6 | Hz | Doppler shift measured by SET for a satellite signal. |
| Whole chips | 0-1022 | chips | Whole value of the code phase measurement in unites of 1 chip. |
| Fractional chips | 0 to <1 | chips | Fractional value of the code phase measurement. |
| Multipath indicator | | | Indicator of the multipath as measured by the SET and is set to low, medium or high. |
| Pseudorange RMS error | 0 to 112 | Meters | Measured RMS error in meters. |

In a Network-initiated scenario, once the LS (e.g., SLP) determines the location of a SET, the location may be provided to the requesting network entity. If the LS is trusted by the recipient of the location, then the location may be considered to be valid even though the location may not be valid. The integrity of the location calculated by the LS is important as it may be utilized by emergency services operators, may be used to gain restricted access to location based services, etc. Thus, an unscrupulous user or intermediary who successfully spoofs or falsifies one or more location measurements may fraudulently gain access to a broadcast restricted to a particular set of geographically located users, may provide the authorities with an incorrect location to, e.g., a tracked shipment, may disguise criminal activities by deceiving a law-enforcement LBA, etc. The aim of the spoofer may thus be to convince an LS to provide a location that the spoofer desires by falsifying measurement data such that the location provided by the LS is effectively predetermined by the spoofer.

To spoof a location, a user may need the satellite ephemeris which is generally employed to determine the location of the satellites for a given time. The user may determine the range to each satellite in view of the desired location and use these as a basis for determining pseudorange measurements. These measurements are generally converted to pseudoranges by simulating a clock error and/or introducing other errors such as ionosphere, troposphere and other random errors.

Figure 3:
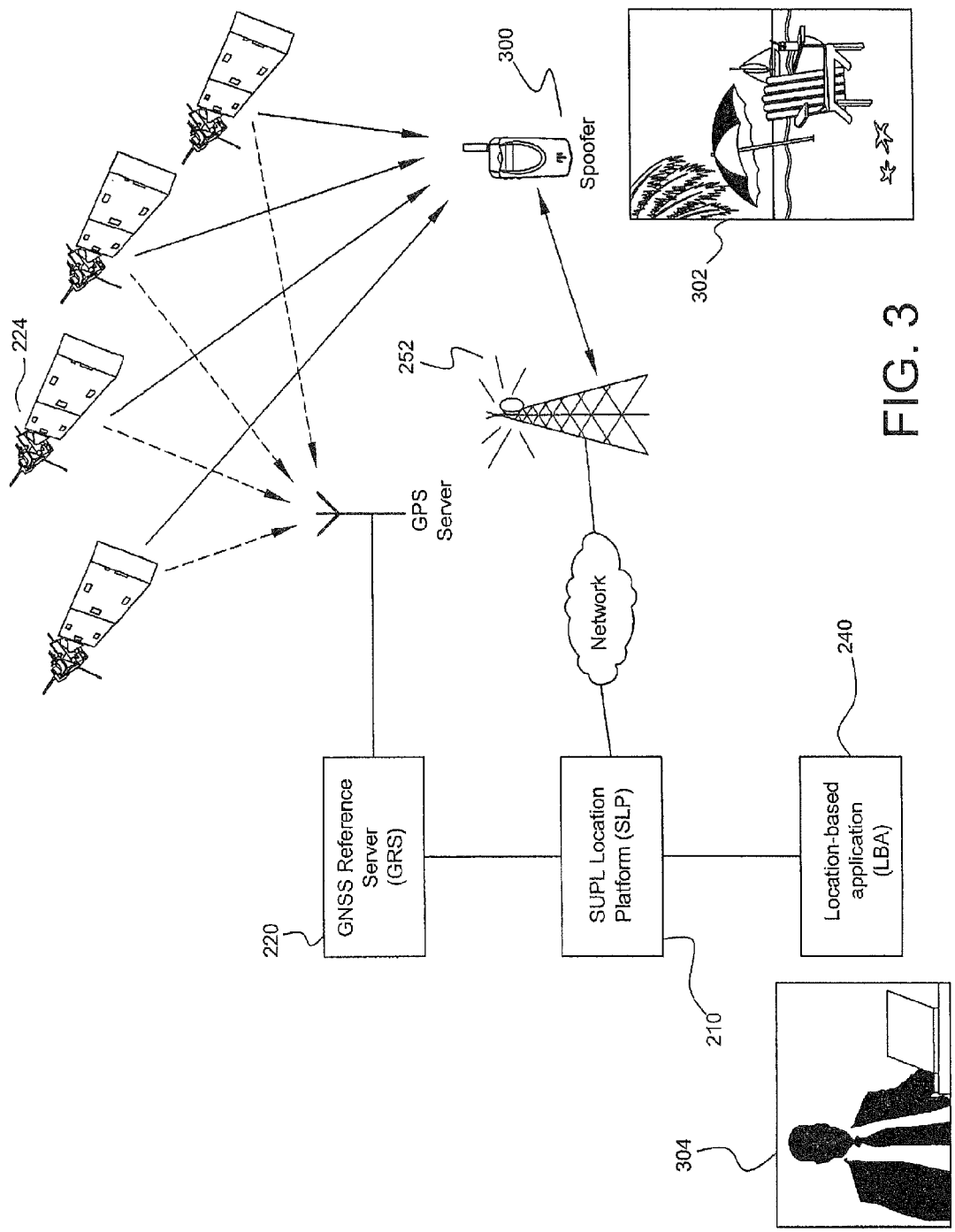
FIG. 3 is a schematic representation of a SET falsifying its location to the SLP of FIG. 2.

FIG. 3 provides an example of an SET falsifying its location to the SLP of FIG. 2. With reference to FIG. 3, an LBA 240 may request the location of a SET 300. In this example, the SET 300 may be positioned at a certain location 302 but is desirous to indicate that the user or SET 300 is in another location 304. The spoofing SET 300 may utilize satellite ephemeris to calculate GPS measurements and send the calculated GPS measurements to the SLP 210 which may then employ a PCF to determine the location of the spoofing SET 300. The determined location 304 of the SET 300 may then be provided to the LBA 240. A spoofer may thus employ ephemeris to determine the location of the satellites (and hence the predicted pseudorange measurements). The ephemeris may be from a request to the SLP 210 for assistance data or may be provided from another source (e.g., the Internet, the International GNSS Service (IGS), etc.). One piece of information required by the spoofing SET 300 may be the Cell-ID. From the Cell-ID, the SLP 210 may determine the coverage area of the cell, calculate appropriate assistance data, and the Cell-ID may be utilized as the initial location estimate for the PCF. The Cell-ID may also, in one embodiment, be employed for location assurance on the SLP 210 as will be discussed below. If the spoofing SET 300 desires to spoof a location in the current cell within, e.g., 10 to 20 km, of his present location, then the Cell-ID may be employed to request assistance data which is then utilized to determine the location of the satellites in view and calculate pseudoranges. These pseudoranges may then be manipulated to introduce errors, converted to code phases, and sent to the SLP 210 to spoof a desired location. Falsifying locations outside the current cell may, however, require the spoofing SET to know the Cell-ID for the desired location via a database or other method.

Figure 4:
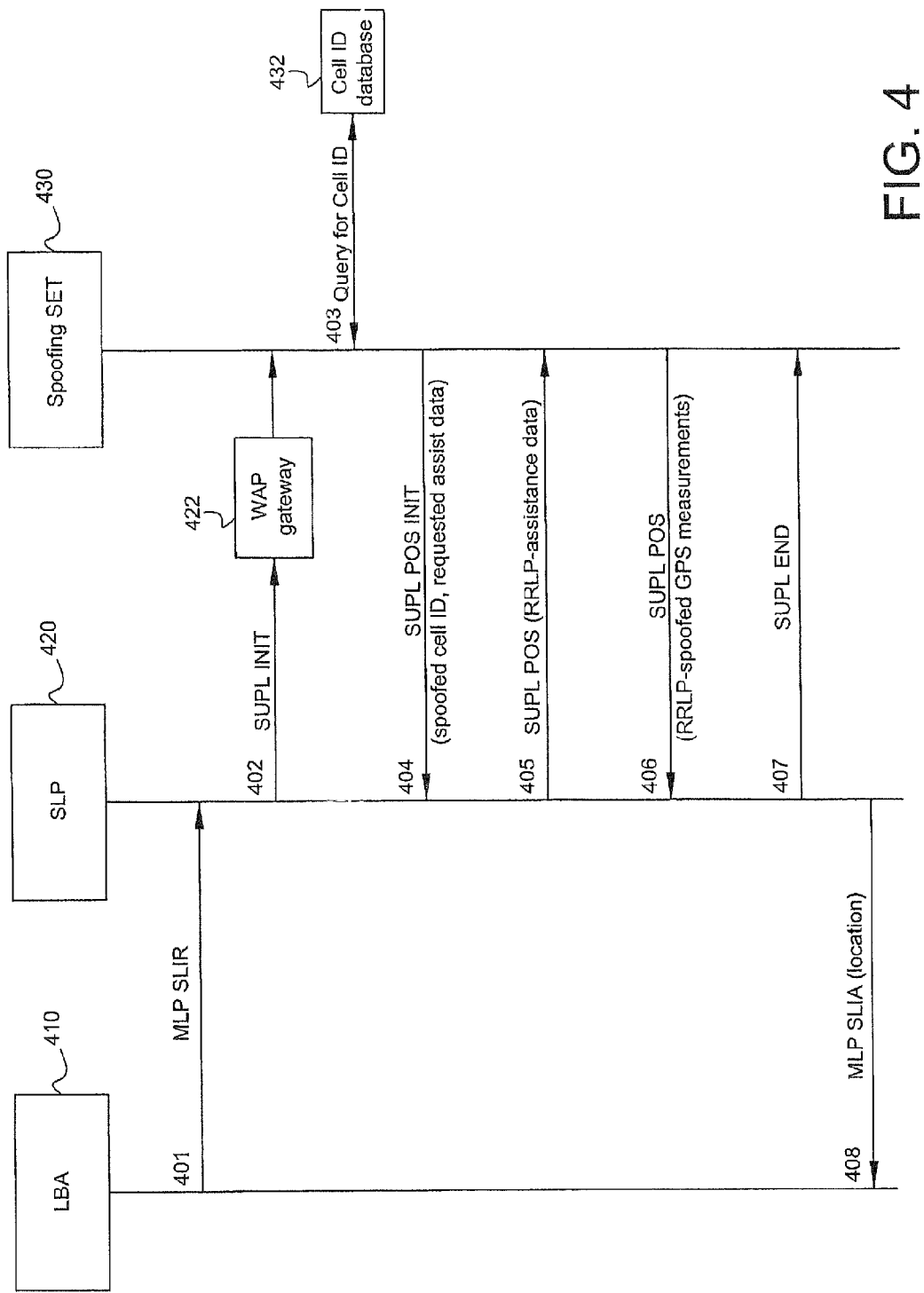
FIG. 4 is an illustration of a network-initiated, SET-assisted process.

Generally, the spoofing SET may require the ephemeris and/or ionosphere model, the GPS time at which to calculate the location (normally the current time), the desired location (WGS 84 latitude, longitude, altitude), and/or a Cell-ID in the vicinity of the desired location. In one embodiment, when the LS is an SLP, messaging between the SLP and the spoofing SET is illustrated in FIG. 4. With reference to FIG. 4, an LBA 410 may request the location of a SET 430 and send a Mobile Location Protocol (MLP) Standard Location Immediate Request (SLIR) to an SLP 420 (step 401). The SLP 420 may then send, at step 402, a SUPL INIT message to the spoofing SET 430 via, e.g., a WAP gateway 422. The spoofing SET 430 may then determine the Cell-ID in the vicinity of a desired location at step 403. The Cell ID may then be provided to the SLP 420 so assistance data that the SET 430 receives is relevant to the desired location. The Cell-ID may in one instance be provided by a cell database 432. A cell database 432 may be, but is not limited to, an external entity such as a database on the Internet or a local database or a database provided by the spoofer over time. The spoofing SET 430 may, in step 404, provide a SUPL POS INIT message to the SLP 420 with the spoofed cell and the requested assistance data. In step 405, the SLP 420 may return a SUPL POS message with the required assistance data, and in step 406 the spoofing SET 430 may employ the assistance data to determine the measurements to the satellites from the desired location and sends the same in a SUPL POS message. The SLP 420 may then, in step 407, provide a SUPL END message to the spoofing SET 430 to terminate the location transaction and return a falsified location to the LBA 410 in a Standard Location Immediate Answer (SLIA) message in step 408. This procedure may generally enable a spoofing SET to simulate locations anywhere on the Earth if the SET 430 has access to an adequate cell database 432. Alternatively, assistance data may be provided from a source separate to the SLP 420 (e.g., the Internet or another network source); thus, in step 404, the SET 430 may indicate that assistance data is unnecessary and may receive a SUPL POS message (step 405) without assistance data. The SET 430 may then employ its external source of assistance data as an input to spoofing the GPS measurements.

Figure 5:
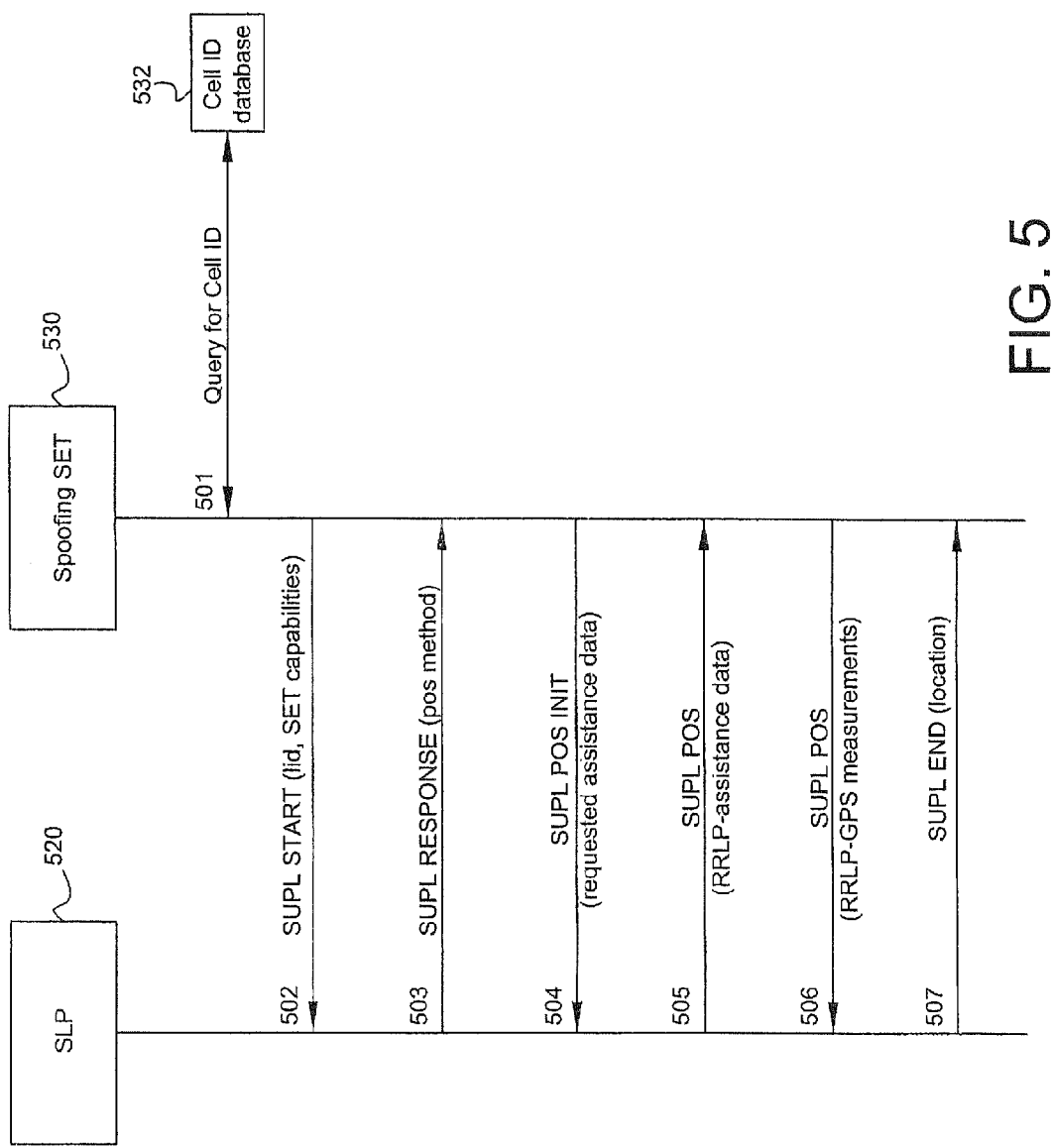
FIG. 5 is an illustration of a SET-initiated, SET-assisted process.

FIG. 5 is an illustration of a SET-initiated, SET-assisted process. With reference to FIG. 5, a spoofing SET 530 may determine a Cell-ID for a cell in the vicinity of a desired location at step 501 and send the same to the SLP 520 with details of the capabilities of the SET 530 in a SUPL START message at step 502. The SLP 520 may provide a SUPL RESPONSE message with the positioning method to use in step 503. The SET 530 may then send a SUPL POS INIT message to the SLP 520 with the requested assistance data in step 504. The SLP 520 may then return a SUPL POS message with the required assistance data in step 505. The spoofing SET 530 may utilize the assistance data to determine the applicable measurements from the satellites with respect to the desired location and send the measurements in a SUPL POS message, in step 506, to the SLP 520. The SLP 520 determines a location (the desired location of the spoofing SET 530) and may cache the determined location (for subsequent location requests). The SLP 520 may then send a SUPL END message to the spoofing SET 530, in step 507, with the location of the SET 530 to terminate the location transaction.

To calculate a desired location, the spoofing SET may determine the location of all of certain GPS satellites at the time of transmission and determine the elevation of satellites relative to the desired location while discarding any that are below the horizon. The spoofing SET may also determine the ionosphere delay between the desired location and a satellite using, e.g., the Klobuchar ionosphere model and may add applicable delays to the measurements. The spoofing SET may also determine the troposphere delay between the desired location and a satellite using, e.g., the Hopfield troposphere model and add the delay to the measurements. Finally, the spoofing SET may apply a satellite clock correction and group delay to the range which may ultimately result in an LS determining a location for the SET within a meter of the desired location. This type of spoofing, however, may be easily detected by an LS as the receiver clock error provided by the spoofing SET would be very small (e.g., less than $1*10^{-10}$ seconds), the residuals determined as part of the least squares process would be small, and/or the uncertainty ellipse would be small (e.g., less than 1 meter of uncertainty). A more sophisticated spoofer, however, may manipulate the measurements by introducing random errors to each measurement and/or manipulate all of the measurements by a fixed amount thereby simulating a handset clock error. Further, a more sophisticated spoofer may also send a subset of the satellite measurements instead of the complete set of satellites in view. In one embodiment of the present subject matter, a spoofing SET may thus be employed to validate anti-spoofing protection on an LS and may also be used as a verification tool to simulate location measurements from anywhere on the Earth.

By way of another embodiment, for a SET to falsify measurements, several calculations must be performed. First, the location of all of the GPS satellites at the time of transmission of the signal should be determined. The time of transmission may provide the time that a satellite signal took to travel from the satellite to the receiver and hence the range. With knowledge of the time of receipt, it may be noted that the satellite has moved from the location where it was when it transmitted the signal and the time of transmission should be corrected through, in one embodiment, an iterative process whereby at each iteration the range may be re-calculated based upon a respective transmission time until the range between one iteration and the next changes by a small amount. For example, a satellite range may be set to zero and the following steps performed until the range between one iteration and the next changes by a small amount: (i) re-adjust the satellite transmission time by the following relationship: satelliteTransmitTime=spoofedTime−(satellite range/speed of light); (ii) calculate the location of the satellite at the satellite transmit time; (iii) determine the range to the satellite by the following relationship: Range=distance between desired location and satellite location. Satellite locations may be, in one embodiment, determined using the navigation model data as specified in the GPS IS 200 specification or another specifications for other GNSSs. Next, the elevation for each satellite relative to the desired location may be determined and any elevation below the horizon discarded. Once the location of the satellites are determined, then their respective elevation angle relative to the ground at the desired location may be calculated. A mask angle may also be applied to discard satellites that are below a specific angle. Unhealthy satellites may be discarded utilizing health bits in the ephemeris. The remaining set of satellites may now include all possible healthy satellites in view of the desired location. A spoofing SET may then discard a certain number of the satellites to provide measurements for a configured number of satellites or a random number of satellites (e.g., greater than the minimum to calculate a location). As it is uncommon that a normal GPS receiver is able to make range measurements to all possible satellites in view, this may be used by an LS to determine that a SET is spoofing; therefore, the SET may discard a subset of satellites to disguise the fact that it is indeed spoofing its location or respective measurement(s). In another embodiment of the present subject matter, a spoofing SET may thus be utilized to validate anti-spoofing protection on an exemplary LS and/or used as a verification tool to simulate location measurements.

In another embodiment, the following steps may then be performed for each satellite: (i) determine the satellite clock correction (distance in meters) and group delay for each satellite for its time of transmission and store the same; (ii) apply a Geometric range correction to compensate for the rotation of the earth during the predicted time of flight; (iii) re-calculate the range to the satellite from the desired location to the corrected location of the satellite; (iv) determine the ionosphere delay for each satellite between the desired location and the satellite using the Klobuchar ionosphere model and add the delay to the measurement; (v) determine the troposphere delay for each satellite between the desired location and the satellite using the Hopfield troposphere model and add the delay to the measurement; (vi) apply a configurable random error to each measurement; (vii) apply a clock error to each measurement; and (viii) apply the satellite clock correction and group delay to the range using the following relationship: satRange=calculatedRange−satClockCorrectionMeters. Of course, an exemplary spoofing SET according to any embodiment of the present subject matter may be utilized to validate anti-spoofing protection on a respective LS and/or may be used a verification tool to simulate location measurements.

Some protection may be present on an exemplary SLP which may restrict the ability of a spoofing SET to falsify a location anywhere on Earth such as, but not limited to, location assurance and Cell-ID integrity methods. For example, in one embodiment, an exemplary SLP may determine the distance between the location determined from a cell lookup and the GPS-calculated location. If the distance is larger than a predetermined threshold, then the SLP may deem that the measurements are invalid and may not provide the spoofed location to the LBA. An exemplary and non-limiting distance for location assurance protection may be 50 km or less. A spoofing SET may, however, invalidate certain methods of location assurance protection by having a comprehensive cell ID database so the desired location is within the vicinity of one of the cells in the database. Additional integrity checking and location assurance may also be provided in additional embodiments of the present subject matter.

For example, another embodiment of the present subject matter may include an aspect of integrity checking by using a location calculated by alternate location technology methods. For example, the location selected by an exemplary MLC (e.g., the location having the most precise location technology or smallest uncertainty) may be compared with or crosschecked against other calculated locations to thereby improve the integrity of a determined location and to assist in protecting against falsified locations. Generally, the location of a target SET may be determined by multiple location technologies of various accuracy levels. For example, the location of the SET may be determined utilizing Cell-ID followed by A-GPS. Of course, the process may involve any number of other location methods in series or parallel such as, but not limited to, Assisted Global Navigation Satellite System (A-GNSS), Observed Time Difference of Arrival (OTDOA), Enhanced Observed Time Difference (EOTD), Enhanced Cell-ID (e-CID), Angle of Arrival (AOA), Time Difference of Arrival (TDOA), Power Difference of Arrival (PDOA), Power of Arrival (POA), Time of Arrival (TOA), Frequency Difference of Arrival (FDOA), Global Navigation Satellite System (GNSS), Radio Frequency Identification (RFID), Near field communications (NFC), hybrid technologies, proximity location technologies, and combinations thereof. Thus, an embodiment of the present subject matter may check the selected location of a target SET or device against any number or combinations of the other location(s) to determine whether or not they are consistent. Each of these respective locations may have an uncertainty at a given confidence, and the locations may be deemed to be consistent if their boundaries are within a predefined threshold. Of course, additional satellite measurements may also be utilized as a source for detecting location spoofing, such as, but not limited to, GNSS signal strength, satellite identification codes, number of satellite signals received, time intervals, clock bias, code phases, Doppler shift, and combinations thereof.

Figure 6:
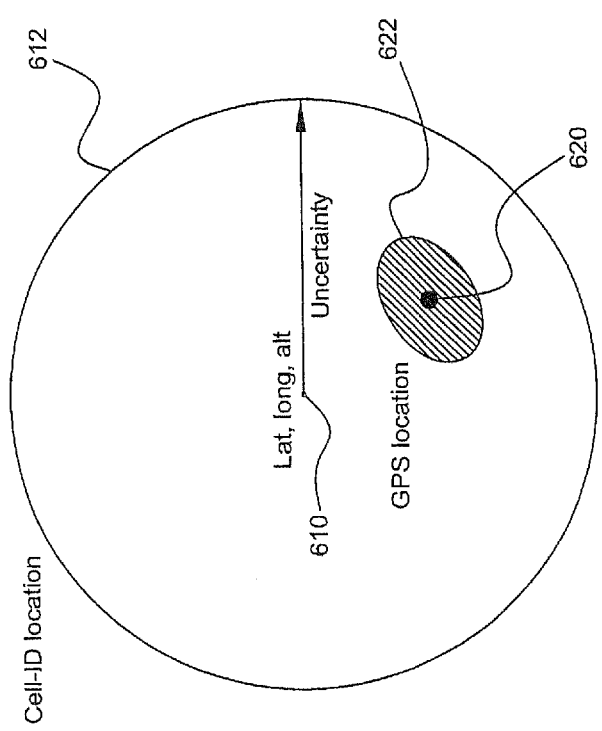
FIG. 6 is a schematic representation of one embodiment of the present subject matter.

FIG. 6 is a schematic representation of one embodiment of the present subject matter. With reference to FIG. 6, a Cell-ID calculated location 610 with an uncertainty circle 612 for an omnicell and a GPS calculated location 620 with its uncertainty ellipse 622 are provided. These locations may be determined as consistent or valid as, for example, the GPS uncertainty ellipse 622 (or location 620) is within the uncertainty circle 612 from the Cell-ID location 610.

Figure 7:
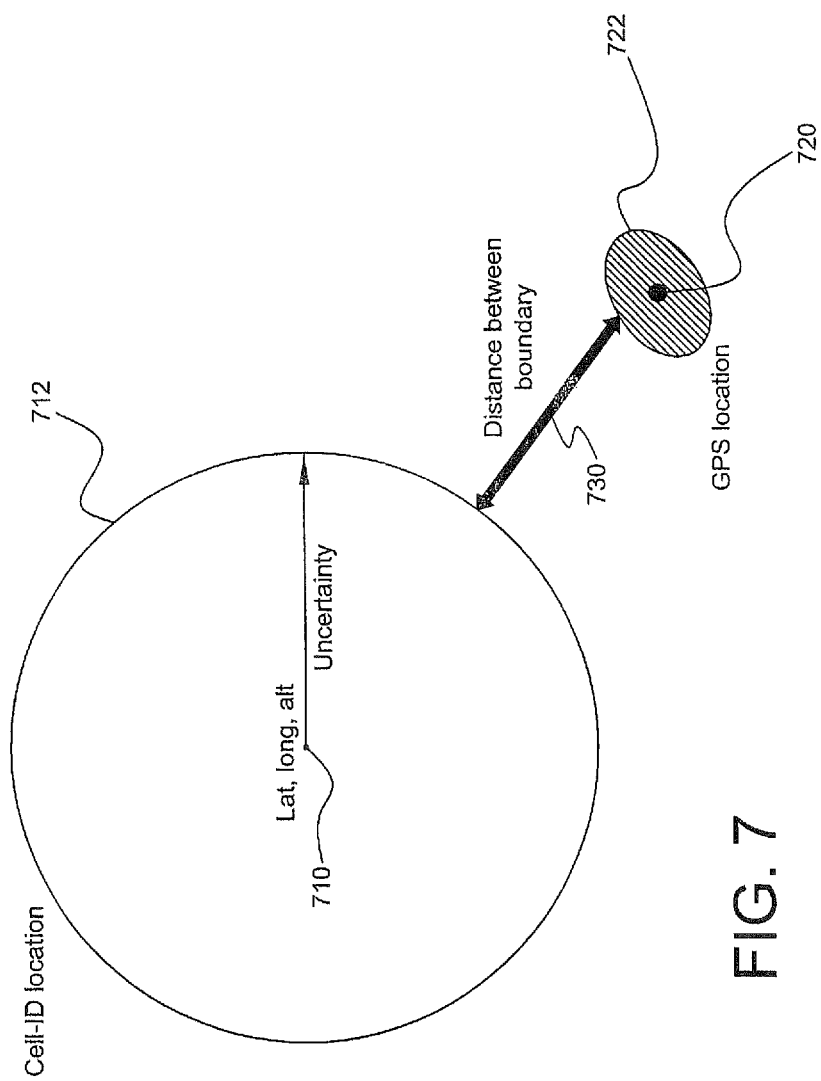
FIG. 7 is a schematic representation of another embodiment of the present subject matter.

FIG. 7 is a schematic representation of another embodiment of the present subject matter. With reference to FIG. 7, a Cell-ID calculated location 710 with an uncertainty circle 712 and a GPS calculated location 720 with its uncertainty ellipse 722 are provided where the GPS calculated location 720 does not lie within the boundary of the Cell-ID location and uncertainty circle 712. In this embodiment, if the distance 730 between the boundaries (from the uncertainty at a predetermined confidence) of the uncertainty circle 712 and ellipse 722 is smaller than a given threshold, then the locations may be deemed to be consistent or valid. If, however, the distance 730 is greater than the threshold, then the location 720 may be determined as invalid. If a location is determined as invalid, the MLC may return an error, mark the respective location transaction as including a potentially spoofed or falsified location, and/or remove the falsified measurement(s) and determine a location of the SET through any number or combinations of other methods. Of course, the consistency threshold for the distance between the uncertainty boundaries may also be different for different location technologies depending upon the reliability of the locations calculated.

Figure 8:
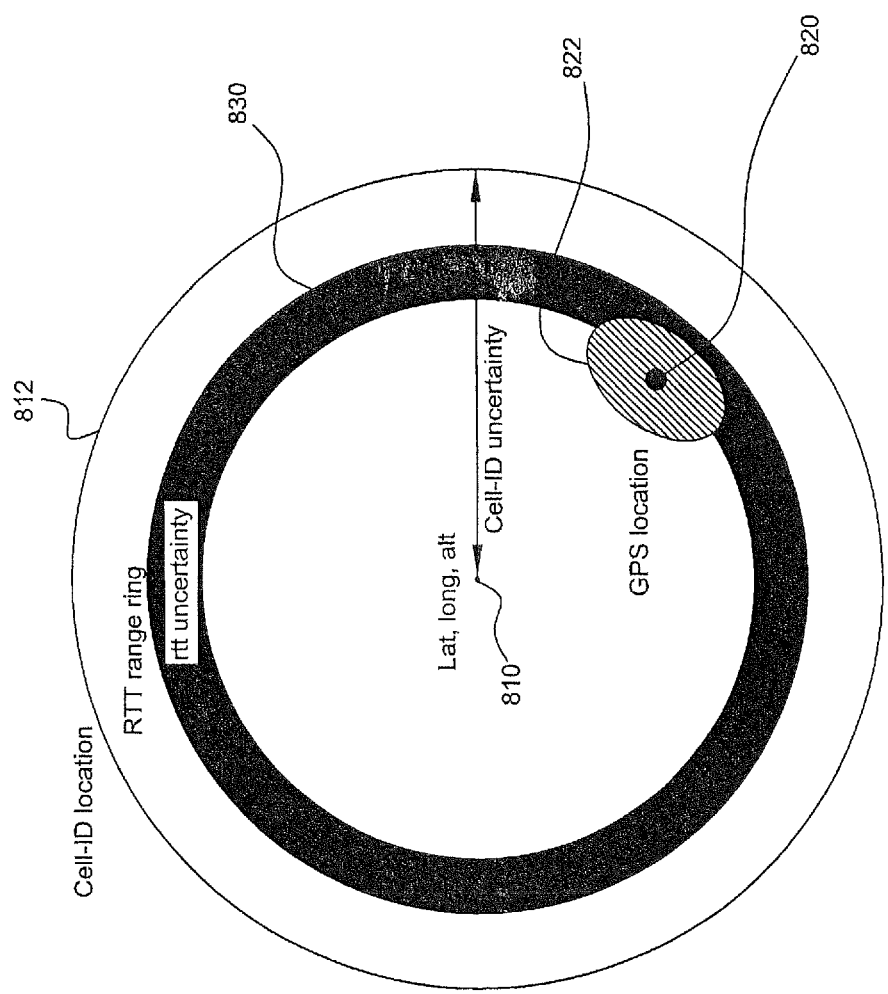
FIG. 8 is a schematic representation of a further embodiment of the present subject matter.

FIG. 8 is a schematic representation of a further embodiment of the present subject matter. With reference to FIG. 8, a Cell-ID calculated location 810 and uncertainty circle 812 are provided along with a GPS calculated location 820 and uncertainty ellipse 822 and an RTT range ring 830. In this embodiment, the GPS location 820 and/or ellipse 822 is consistent with all of the other location results and may thus be determined as a valid location.

Figure 9:
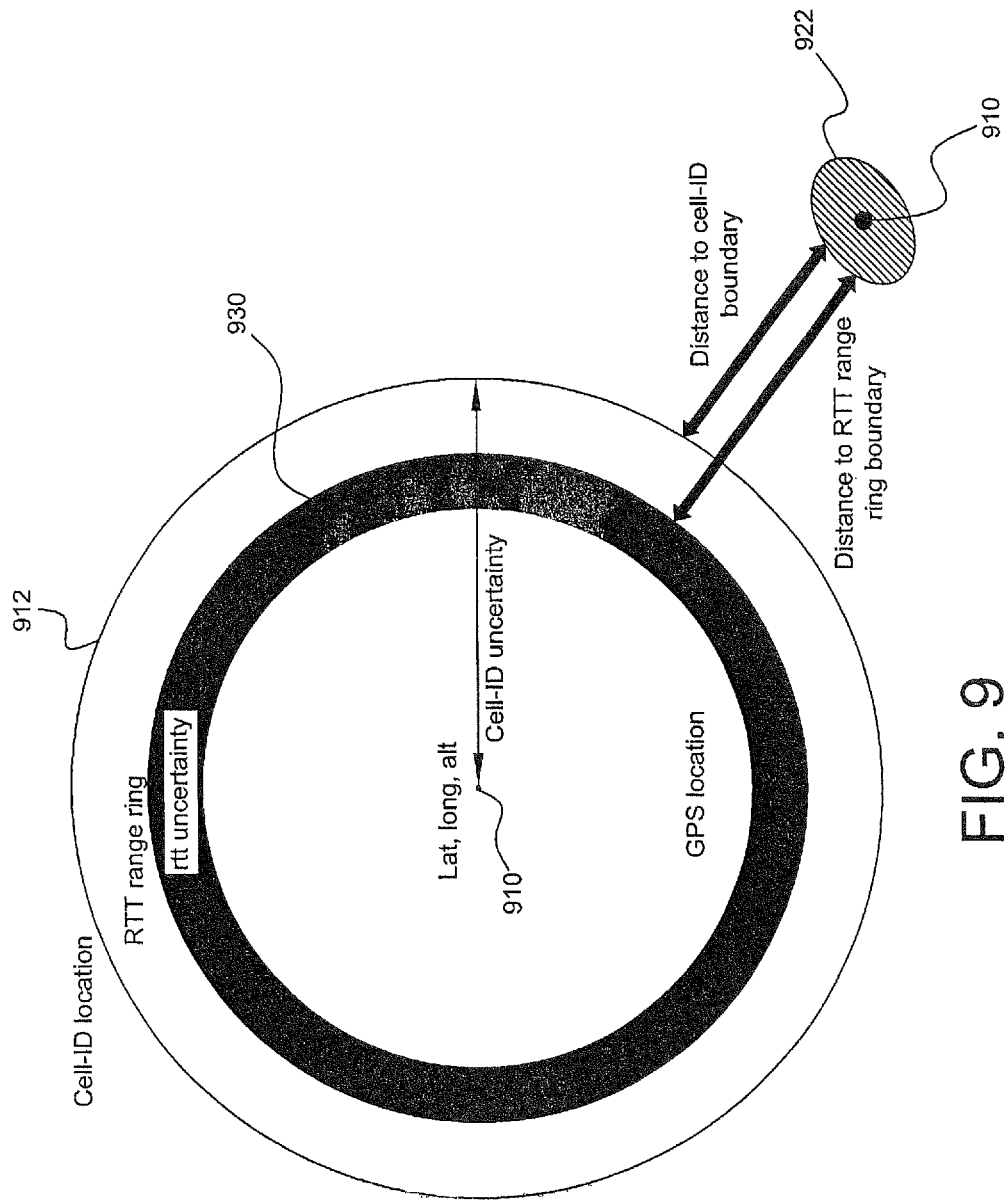
FIG. 9 is a schematic representation of an additional embodiment of the present subject matter.

FIG. 9 is a schematic representation of an additional embodiment of the present subject matter. With reference to FIG. 9, a Cell-ID calculated location 910 and uncertainty circle 912 are provided with a GPS calculated location 920 and uncertainty ellipse 922 and an RTT range ring 930. In this embodiment, even if the GPS location 920 and/or ellipse 922 is outside the Cell-ID location and uncertainty circle 912, the location 920 may still pass the threshold test for the Cell-ID location but fail the consistency check with the RTT range ring 930. In this case, the location may be determined as invalid, and the MLC may return an error, mark the respective location transaction as including a potentially spoofed or falsified location, or remove the falsified measurement(s), and/or determine the location through any number or combinations of other methods. Of course, the aforementioned embodiments illustrated in FIGS. 6-9 may include location determinations using any number of location methods, such as, but not limited to, OTDOA, EOTD, e-CID, AOA, TDOA, PDOA, POA, TOA, FDOA, GNSS, RFID, NFC, hybrid technologies, proximity location technologies, and combinations thereof, and such embodiments should not limit the scope of the claims appended herewith.

In an alternative embodiment, Cell-ID integrity may be provided where an exemplary SLP may utilize network signaling to validate and/or check the reported Cell-ID. For example, when the SLP receives a Cell ID from the SET, the SLP may send a message through nodes in the respective network to validate whether the SET is actually attached to that cell. The only way for a spoofing SET to avoid this protection is to utilize the Cell-ID to which the spoofing SET is attached. Thus, if the spoofing SET desires to falsify a location on the other side of the Earth from that cell, assistance data must be retrieved from an external entity such as described above as the SLP may provide assistance data specific to the supplied Cell-ID. If an exemplary SLP has both Cell-ID integrity and location assurance, a spoofing SET is restricted to spoofing locations within the vicinity of that cell thereby providing location assurance protection to a respective server of 50 km or less. The LS may, in one embodiment, include Cell-ID integrity by default. For example, an SMLC in a GERAN network or a SAS in a UTRAN network may provide Cell-IDs rather than the Cell-ID being provided by a SET. Thus, for these networks, a spoofing SET may be restricted to falsifying a location within the vicinity of the cell if location assurance according to embodiments of the present subject matter is enabled.

Figure 10:
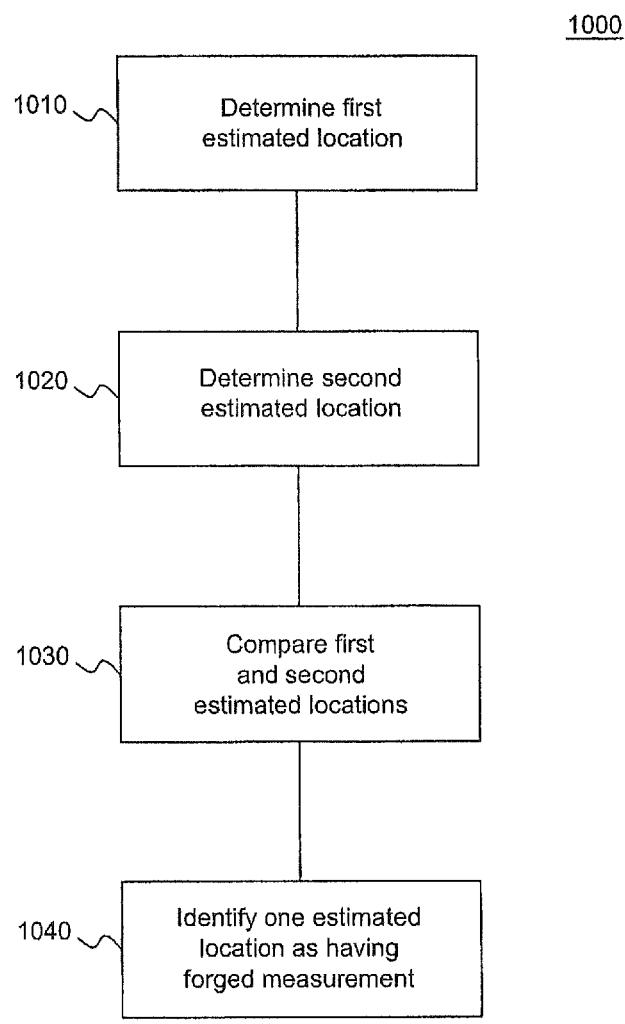
FIG. 10 is a block diagram of one embodiment of the present subject matter.

FIG. 10 is a block diagram of one embodiment of the present subject matter. With reference to FIG. 10, a method 1000 is provided for determining whether an estimated location of a wireless device includes one or more forged location measurements. The method may include at step 1010 determining a first estimated location of the wireless device using a first set of location measurements and at step 1020, determining a second estimated location of the wireless device using a second set of location measurements. The first set and second set of location measurements may be produced using a location technology such as, but not limited to, Cell-ID, A-GNSS, OTDOA, EOTD, e-CID, AOA, TDOA, PDOA, POA, TOA, FDOA, GNSS, RFID, NFC, hybrid technologies, proximity location technologies, and combinations thereof. In one embodiment, the second set of location measurements may be produced using a location technology different than the location technology used to produce the first set of location measurements. The first set of location measurements may be provided by a database having information from a reference station network. Further, the first estimated location may be determined as a function of coarse acquisition ("C/A") code phase shift information, Doppler information or signals provided by a cellular network. Of course, the first estimated location may be determined using location measurements from signals received from a first set of satellites, and the second estimated location may be determined using location measurements from signals received from a second set of satellites. The second set of satellites may be mutually exclusive or a subset of the first set of satellites.

At step 1030, the first estimated location may be compared to the second estimated location, and at step 1040, one of the determined locations identified as having one or more forged location measurements if the comparison between the first estimated location and second estimated location is greater than a predetermined threshold. In one embodiment, the predetermined threshold may be a function of the uncertainty of the location technology utilized to produce the first and/or second set of location measurements. In another embodiment, step 1030 may include comparing the first estimated location and the first estimated location's uncertainty at a given confidence to the second estimated location and the second estimated location's uncertainty at a given confidence. In an additional embodiment, the method 1000 may include determining a third estimated location of the wireless device from signals using a third set of location measurements, the third set excluding one or more location measurements from the set of location measurements having a forged measurement.

Figure 11:
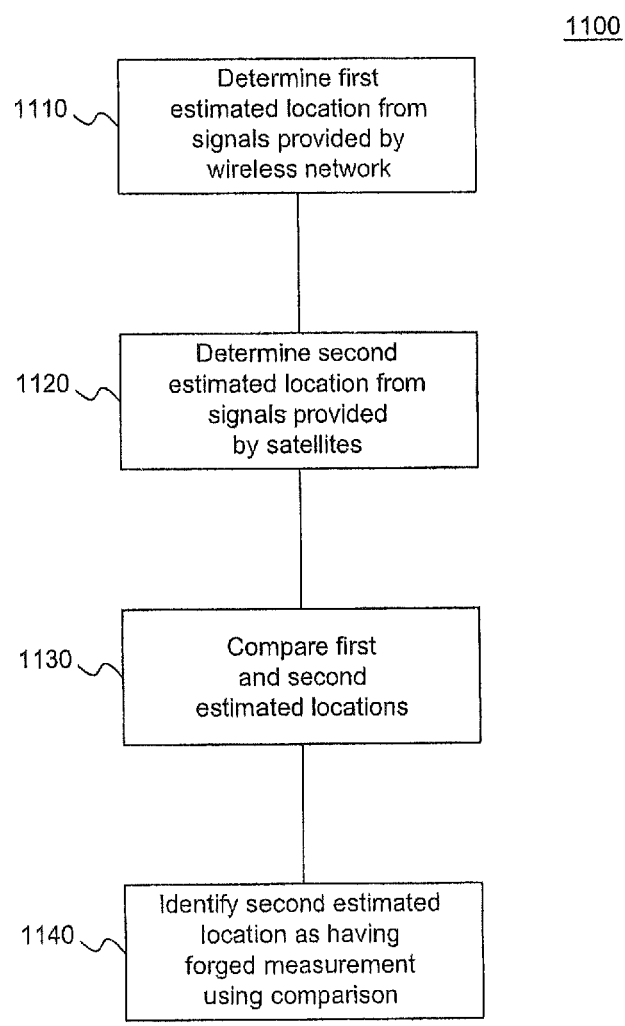
FIG. 11 is a block diagram of one embodiment of the present subject matter.

FIG. 11 is a block diagram of one embodiment of the present subject matter. With reference to FIG. 11, a method 1100 is provided for determining whether an estimated location of a wireless device includes one or more forged location measurements. The method 1100 may include at step 1110 determining a first estimated location of the wireless device from information or signals provided by a cellular network and at step 1120 determining a second estimated location of the wireless device from signals received from a set of satellites. The first and second estimated locations may then be compared at step 1130, and the second estimated location identified as having one or more forged signals if the comparison between the first estimated location and second estimated location is greater than a predetermined threshold at step 1140. In an additional embodiment, step 1130 may include comparing the first estimated location and the first estimated location's uncertainty at a given confidence to the second estimated location and the second estimated location's uncertainty at a given confidence.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims. Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of a data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code) may be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may also be deployed to be executed on one computer or on multiple computers that are located at one site or distributed across multiple sites and interconnected by a communication network.

The processes and logic flows described herein may be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a GNSS receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As shown by the various configurations and embodiments illustrated in FIGS. 1-11, a method and system for location assurance of a mobile device location have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

The invention claimed is:

1. A method for forging location measurements at a wireless device, comprising:
   determining, at the wireless device, a Cell-ID for a cell in a vicinity of a false location;
   receiving, at the wireless device, an identification of a set of satellites that are within view from the false location;
   generating, at the wireless device, forged location measurements that characterize satellite signals from a subset of the set of satellites that would be received at the false location; and
   providing, from the wireless device, the forged location measurements.

2. The method of claim 1, wherein the subset of the set of satellites is a proper subset of the set of satellites.

3. The method of claim 1, wherein the generating further comprises introducing random errors into the forged location measurements.

4. The method of claim 3, wherein the random errors includes a simulated clock error.

5. The method of claim 3, wherein the random errors include a simulated ionosphere error.

6. The method of claim 3, wherein the random errors include a simulated troposphere error.

7. The method of claim 1, wherein the determining comprises querying a cell database to retrieve the Cell-ID for the cell in the vicinity of the false location.

8. The method of claim 1, wherein the wireless device is located in a cell with a different Cell-ID than the false location.

9. A wireless device for forging location measurements, comprising:
   a memory for storing machine executable instructions; and
   a processor to execute the machine executable instructions, the machine executable instructions configured to:
      determine an identification of a set of satellites that are within view from a false location;
      generate forged location measurements that characterize satellite signals from a subset of the set of satellites that would be received at the false location;
      introduce random errors into the forged location measurements; and
      output the forged location measurements.

10. The wireless device of claim 9, wherein the identification of the set of satellites is received from a secure user plan location (SULP) location platform (SLP).

11. The wireless device of claim 9, wherein the subset of the set of satellites is a proper subset of the set of satellites.

12. The wireless device of claim 9, wherein the random errors includes a simulated clock error.

13. The wireless device of claim 9, wherein the random errors include a simulated ionosphere error.

14. The wireless device of claim 9, wherein the random errors include a simulated troposphere error.

15. A wireless device for forging location measurements, comprising:
   a memory for storing machine executable instructions; and
   a processor to execute the machine executable instructions, the machine executable instructions configured to:
      determine an identification of a set of satellites that are within view from a false location;
      query a cell database to retrieve a Cell-ID for a cell in the vicinity of the false location;
      generate forged location measurements that characterize satellite signals from a subset of the set of satellites that would be received at the false location; and
      output the forged location measurements.

16. The wireless device of claim 9, wherein the wireless device is located in a cell with a different Cell-ID than the false location.

17. A system for forging location measurements, the system comprising:
   a computer having a location based application (LBA) executing thereon, the LBA being configured to provide a request for a location of a secure user plan location (SULP) enabled terminal (SET) to an SULP location platform (SLP);
   the SLP being configured to provide a location request message to the SET in response to receiving the request of the location of the SET;
   the SET being configured to:
      receive, from the SLP, the location request message;
      determine a Cell-ID for a cell in a vicinity of a false location in response to the location request message;
      determine an identification of a set of satellites that are within view from the false location;
      generate forged location measurements that characterize satellite signals from a subset of the set of satellites that would be received at the false location; and
      provide the forged location measurements to the SLP.

18. The system of claim 17, wherein the SLP is further configured to provide data characterizing the falsified location to the LBA in response to the request for the location of the SET.

19. The system of claim 17, wherein the subset of the set of satellites is a proper subset of the set of satellites.

20. The system of claim 17, wherein the SET is further configured to introduce random errors into the forged location measurements.

21. The system of claim 17, wherein the SET is located in a cell with a different Cell-ID than the false location.

* * * * *